United States Patent [19]

Chinnaswamy et al.

[11] Patent Number: 4,968,977

[45] Date of Patent: Nov. 6, 1990

[54] MODULAR CROSSBAR INTERCONNECTION METWORK FOR DATA TRANSACTIONS BETWEEN SYSTEM UNITS IN A MULTI-PROCESSOR SYSTEM

[75] Inventors: Kumar Chinnaswamy, Milford; Michael E. Flynn, Grafton; R. Stephen Polzin, Holden, all of Mass.

[73] Assignee: Digital Equipment Corporation, Maynard, Mass.

[21] Appl. No.: 306,336

[22] Filed: Feb. 3, 1989

[51] Int. Cl.[5] ............................................. H04O 11/00
[52] U.S. Cl. .................................. 340/825.8; 370/58.1
[58] Field of Search ...................... 340/825.02, 825.79, 340/825.8, 825.5, 826, 825.04; 370/58.1; 379/271, 272, 273, 274, 291, 292, 306; 364/133, 134

[56] References Cited

U.S. PATENT DOCUMENTS

| | | | |
|---|---|---|---|
| 3,637,944 | 1/1972 | Gueldenpfennig | 379/274 |
| 3,916,380 | 10/1975 | Fletcher et al. | 340/825.04 |
| 4,038,638 | 7/1977 | Hwang | 340/825.8 |
| 4,173,713 | 11/1979 | Giesken et al. | 379/272 |
| 4,417,244 | 11/1983 | Melas | 340/825.8 |
| 4,577,308 | 3/1986 | Larson et al. | 370/9 |
| 4,616,358 | 10/1986 | Rehm et al. | 370/58 |
| 4,635,250 | 1/1987 | Georgiou | 370/58 |
| 4,653,085 | 3/1987 | Chan et al. | 379/94 |
| 4,692,917 | 9/1987 | Fujioka | 370/60 |
| 4,695,999 | 9/1987 | Lebizay | 370/58 |
| 4,706,150 | 10/1987 | Lebizay | 340/825.5 |
| 4,752,777 | 6/1988 | Franaszek | 340/825.79 |
| 4,821,034 | 4/1989 | Anderson et al. | 340/825.8 |
| 4,845,722 | 7/1989 | Kent et al. | 370/58 |

FOREIGN PATENT DOCUMENTS 0059838 9/1982 European Pat. Off. .
0110569 6/1984 European Pat. Off. .
0125773 11/1984 European Pat. Off. .

OTHER PUBLICATIONS

P. Chilton et al., "MEUNET-A High Performance, High Availability Packet Switch," FTCS 14, The Fourteenth International Conference on Fault-Tolerant Computing, IEEE, pp. 20–22 (Jun. 1984).

Primary Examiner—Donald J. Yusko
Assistant Examiner—Dervis Magistre
Attorney, Agent, or Firm—Arnold, White & Durkee

[57] ABSTRACT

For efficiently handling data transactions between various system units (CPUs, I/O units and main memory units) in a multi-processor system, the system units are linked via a plurality of expandable crossbar modules, each providing a set of interconnections or well-defined mappings between the sets of input and output nodes, with each output being defined in terms of only one input. In addition to the nodes provided at the input and output sections, each crossbar module is also provided with discrete input and output expansion portions through which the module may be linked to other identically configured crossbar modules when additional nodes are to be integrated into the system. The expansion ports allow serial linking of crossbar modules so as to establish a connection between source and destination nodes which are spread across different crossbar modules. The serially-linked expansion ports realize direct mapping between all system nodes in the form of a two-stage network; the basic crossbar design remains the same and there is no need for the problematic redesign of crossbar modules for accommodating added data transfer nodes. The modular crossbar design is particularly adapted for use with different system configurations having different numbers of communication nodes and permits a system to be upgraded by adding communication nodes by using additional identically configured crossbar modules.

12 Claims, 7 Drawing Sheets

Fig. 5

TABLE OF 4-BIT ORIGINAL CONTROL FIELDS / COMMANDS

| CTRL. BITS | DEC. EQWT. | PORT DESIGNATION | MODULE # |
|---|---|---|---|
| 0000 | 0 | ---- | |
| 0001 | 1 | CPU 1 | I |
| 0010 | 2 | CPU 2 | I |
| 0011 | 3 | MEM 1 | I |
| 0100 | 4 | I/O 1 | I |
| 0101 | 5 | SPU | I |
| 0110 | 6 | ---- | |
| 0111 | 7 | ---- | |
| 1000 | 8 | ---- | |
| 1001 | 9 | CPU 3 | II |
| 1010 | 10 | CPU 4 | II |
| 1011 | 11 | MEM 2 | II |
| 1100 | 12 | I/O 2 | II |
| 1101 | 13 | ---- | |
| 1110 | 14 | ---- | |
| 1111 | 15 | ---- | |

Fig. 6

TABLE OF 3-BIT SUB-CONTROL FIELDS / SIGNAL

| CTRL. BITS | DEC. EQWT. | PORT DESIGNATIONS |
|---|---|---|
| 000 | 0 | ---- |
| 001 | 1 | CPU 1, 3 |
| 010 | 2 | CPU 2, 4 |
| 011 | 3 | MEM 1, 2 |
| 100 | 4 | I/O 1, 2 |
| 101 | 5 | SPU |
| 110 | 6 | EXPANSION |
| 111 | 7 | ---- |

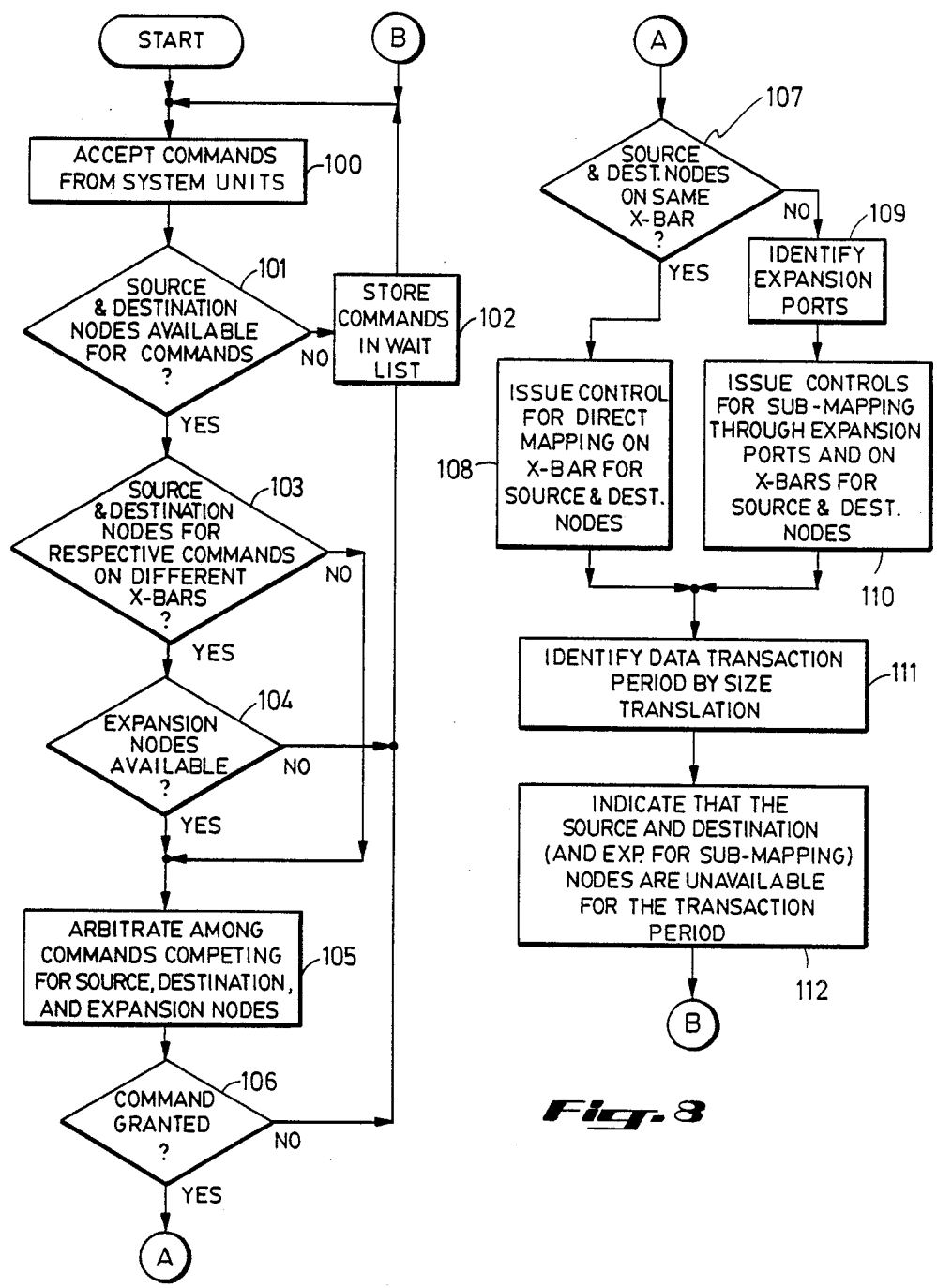

MODULAR CROSSBAR INTERCONNECTION METWORK FOR DATA TRANSACTIONS BETWEEN SYSTEM UNITS IN A MULTI-PROCESSOR SYSTEM

RELATED APPLICATIONS

The present application discloses certain aspects of a computing system that is further described in the following U.S. patent applications filed concurrently with the present application: Evans et al., AN INTERFACE BETWEEN A SYSTEM CONTROL UNIT AND A SYSTEM PROCESSING UNIT OF A DIGITAL COMPUTER, Ser. No. 07/306,325 filed Feb. 3, 1989; Arnold et al., METHOD AND APPARATUS FOR INTERFACING A SYSTEM CONTROL UNIT FOR A MULTIPROCESSOR SYSTEM WITH THE CENTRAL PROCESSING UNITS, Ser. No. 07/306,837 filed Feb. 3, 1989; Gagliardo et al., METHOD AND MEANS FOR INTERFACING A SYSTEM CONTROL UNIT FOR A MULTI-PROCESSOR SYSTEM WITH THE SYSTEM MAIN MEMORY, Ser. No. 07/306,326 filed Feb. 3, 1989; D. Fite et al., METHOD AND APPARATUS FOR RESOLVING A VARIABLE NUMBER OF POTENTIAL MEMORY ACCESS CONFLICTS IN A PIPELINED COMPUTER SYSTEM, Ser. No. 07/306,767 filed Feb. 3, 1989; D. Fite et al., DECODING MULTIPLE SPECIFIERS IN A VARIABLE LENGTH INSTRUCTION ARCHITECTURE, Ser. No. 07/307,347 filed Feb. 3, 1989; D. Fite et al., VIRTUAL INSTRUCTION CACHE REFILL ALGORITHM, Ser. No. 07/306,831 filed Feb. 3, 1989; Herman et al., PIPELINE PROCESSING OF REGISTER AND REGISTER MODIFYING SPECIFIERS WITHIN THE SAME INSTRUCTION, Ser. No. 07/306,833 filed Feb. 3, 1989; Murray et al., MULTIPLE INSTRUCTION PREPROCESSING SYSTEM WITH DATA DEPENDENCY RESOLUTION FOR DIGITAL COMPUTERS, Ser. No. 07/306,773 filed Feb. 3, 1989; D. Fite et al., PREPROCESSING IMPLIED SPECIFIERS IN A PIPELINED PROCESSOR, Ser. No. 07/306,849 filed Feb. 3, 1989; D. Fite et al., BRANCH PREDICTION, Ser. No. 07/306,760 filed Feb. 3, 1989; Fossum et al., PIPELINED FLOATING POINT ADDER FOR DIGITAL COMPUTER, Ser. No. 07/306,343 filed Feb. 3, 1989; Grundmann et al., SELF TIMED REGISTER FILE, Ser. No. 07/306,445 filed Feb. 3, 1989; Beaven et al., METHOD AND APPARATUS FOR DETECTING AND CORRECTING ERRORS IN A PIPELINED COMPUTER SYSTEM, Ser. No. 07/306,828 filed Feb. 3, 1989; Flynn et al., METHOD AND MEANS FOR ARBITRATING REQUESTS USING A SYSTEM CONTROL UNIT IN A MULTI-PROCESSOR SYSTEM, Ser. No. 07/306,871 filed Feb. 3, 1989; E. Fite et al., CONTROL OF MULTIPLE FUNCTION UNITS WITH PARALLEL OPERATION IN A MICROCODED EXECUTION UNIT, Ser. No. 07/306,832 filed Feb. 3, 1989; Webb, Jr. et al., PROCESSING OF MEMORY ACCESS EXCEPTIONS WITH PRE-FETCHED INSTRUCTIONS WITHIN THE INSTRUCTION PIPELINE OF A VIRTUAL MEMORY SYSTEM-BASED DIGITAL COMPUTER, Ser. No. 07/306,866 filed Feb. 3, 1989; Hetherington et al., METHOD AND APPARATUS FOR CONTROLLING THE CONVERSION OF VIRTUAL TO PHYSICAL MEMORY ADDRESSES IN A DIGITAL COMPUTER SYSTEM, Ser. No. 07/306,544 filed Feb. 3, 1989; Hetherington et al., WRITE BACK BUFFER WITH ERROR CORRECTING CAPABILITIES, Ser No. 07/306,703 filed Feb. 3, 1989; Flynn et al., METHOD AND MEANS FOR ARBITRATING COMMUNICATION REQUESTS USING A SYSTEM CONTROL UNIT IN A MULTI-PROCESSOR SYSTEM, Ser. No. 07/306,871 filed Feb. 3, 1989; Polzin et al., METHOD AND APPARATUS FOR INTERFACING A SYSTEM CONTROL UNIT FOR A MULTI-PROCESSOR SYSTEM WITH INPUT/OUTPUT UNIT, Ser. No. 07/306,862 filed Feb. 3, 1989; Gagliardo et al., MEMORY CONFIGURATION FOR USE WITH MEANS FOR INTERFACING A SYSTEM CONTROL UNIT FOR A MULTI-PROCESSOR SYSTEM WITH THE SYSTEM MAIN MEMORY, Ser. No. 07/306,404 filed Feb. 3, 1989; and Gagliardo et al., METHOD AND MEANS FOR ERROR CHECKING OF DRAM-CONTROL SIGNALS BETWEEN SYSTEM MODULES, Ser. No. 07/306,836 filed Feb. 3, 1989;

TECHNICAL FIELD

This invention relates generally to multi computer systems in which a plurality of system units including multiple central processor units (CPUs), Input/Output (I/O) units, and main memory units (MMUs) are operated in a parallel fashion. More particularly, this invention relates to an improved interconnection network adapted for use in such a multi-processor system and which provides efficient data transaction linkage between system units.

DESCRIPTION OF RELATED ART

High performance computers have traditionally relied upon the techniques of multi-processing and parallel processing in order to achieve increased computational power by, among other factors, circumventing bottleneck problems resulting from use of a single memory interface through which all data and control information must pass. Parallel architectures, for instance, approach such problems in a variety of ways, ranging from simple replication of conventional architecture to the utilization of completely new machine organizations.

Multi-processor architectures typically comprise a number of processors connected through some form of multi-path communication system to a common shared memory, a shared I/O system, and possibly to each other. High operational speeds and operational redundancy are achieved in high performance systems by provision of multiple communication paths between a plurality of processor units and input/output units along with parallel paths to mass storage and other devices. In a multi-processing system the parallel operation of the plurality of CPUs in conjunction with the system memory units, input/output devices, and other units of the computing system is typically coordinated by a system control unit (SCU) which links all system units ported into it and provides inter-unit communication for efficient exchange of data and related control signals. The SCU keeps all system components active while avoiding inter-unit conflicts and services requests for communications between the system memory and the system units linked through the various ports on the SCU.

Accordingly, one of the important aspects of such a system is to provide an efficient interconnection network linking the various system units that are ported into the SCU. System units in multi-processor systems are generally linked by one of two interconnection techniques: via shared buses or through data switches. A number of factors dictate the choice of one of these techniques for a particular multi-processing application. Shared buses are relatively less expensive but have restricted application because of their inherent time-multiplexed nature of operation which permits only one communication transaction (e.g., a memory to process or contact) to occur at a time. Buses, however, have the advantageous capability of being readily expanded to accept another processor, memory, or other system unit since the interconnection to the bus is necessitated only at a single junction.

Switched networks, on the other hand, allow multiple transactions to be executed concurrently as long as the transactions involved do not relate to the same system unit. More specifically, the processing elements or system units in such networks are interconnected with some kind of switching network with the capacity to transfer many data items simultaneously. A variety of switching networks are conventional and include shuffle networks, augmented data manipulation networks, butterfly switches, and crossbar matrix switches. Crossbar switches, in particular, are commonly used for implementation of a generalized connection network providing a mapping between input and output nodes in such a manner that each input can be switched to any output. However, in interconnected multi-processor systems, the time efficiency resulting from the capability to handle simultaneous multiple communication sessions comes at the expense of switch complexity and the associated increase in cost.

A major disadvantage accruing from the use of switched interconnection networks is the difficulty involved in expanding the number of system nodes beyond a predefined limit. With crossbar switches, for instance, the complexity of connections for "n" modes is given by $n^2$; consequently, the number of connections increases dramatically when new processors and system units are added. As a result, when the node count is high, it becomes necessary to employ complicated multi-stage switching.

A severe restriction associated with crossbar switches is the extreme difficulty in expanding the crossbar to accommodate added system ports. Crossbars are hence designed for specific system configurations; when there is a need for the system configuration to be revised to include additional processors or memory ports, particularly in systems having a modular memory configuration adapted for expandability, a complete redesign of the crossbar network is necessitated.

SUMMARY OF THE INVENTION

For efficiently handling data transactions between various system units in a multi-processor system, the system units are linked via a plurality of expandable crossbar modules, each providing a set of interconnections or well-defined mappings between the sets of input and output nodes, with each output being defined in terms of only one input. In addition to the nodes provided at the input and output sections, each crossbar module is also provided with discrete input and output expansion ports through which the module may be linked to other identically configured crossbar modules when additional nodes are to be integrated into the system. The addition of each new crossbar module functionally replicates the modular capability of the basic crossbar module configuration.

The provision of the expansion ports on each crossbar module accordingly allows a multi-stage interconnection network to simulate the operation of a complete crossbar switch, when a full connection network is desired. It is significant that the provision of the expansion ports on each basic crossbar module permits easy expansion of node-handling capacity without the need for redesigning the crossbar and without the additional full-capacity exchange switches that would be required in a similar multi-stage interconnection network using conventional non-modular crossbars.

According to a preferred embodiment, an interconnection network is provided that permits the SCU to process simultaneous data transactions between units of a multi-processor system, which at its full capacity includes four CPUs, a pair of independently accessible main memory units (MMUs), a pair of input/output (I/O) units, and a console or service processor unit (SPU). Each crossbar module is designed as a $5 \times 5$ crossbar switch adapted to provide a complete mapping of five input nodes to five output nodes. A single crossbar module is hence capable of switching data transactions between a sub-system comprising a pair of CPUs, a single MMU, and a single I/O unit, and a SPU. Each module is provided with an expansion source node and an expansion destination node for serially linking crossbar modules so as to establish a connection between source and destination nodes which are spread across different crossbar modules.

If the sub-system is to be upgraded to its full capacity, it is merely required that an additional crossbar module be provided, with the expansion ports of the separate crossbar modules being linked together in a serial manner, without the need for additional switching arrangements. The serially-linked expansion ports realize the direct mapping of all system modes in the form of a two-stage network; however, what is important is that the basic crossbar design remains the same and the need to redesign the module to accommodate the added data-transfer nodes is obviated.

The modular arrangement using the expansion ports on each crossbar module can conveniently be expanded to accommodate larger node capacities by the addition of a corresponding number of identical crossbar modules. In all cases, a direct mapping of nodes existing across serially expanded crossbars is realized by a series of sub-mappings providing links respectively between a source node within a given crossbar to the output expansion port thereof, the output expansion port to the input expansion port of a crossbar module which includes the destination node, and finally that input expansion port to the destination node itself.

According to a preferred implementation of the modular crossbar scheme of this invention, incoming data transaction commands are buffered and decoded to identify the source and destination ports. A data switch controller is provided for identifying the need for sub-mappings and in response thereto assigning the sub-mappings required for executing a particular direct mapping. More specifically, the controller monitors the availability of data transaction paths by recognizing when any of the specified source and destination nodes become unavailable for participating in data transactions. More importantly the controller determines whether the two nodes specified for a particular data transaction are ported into the crossbar module forming the initial stage of the interconnection network. If the nodes are part of the same module, data transfer is accomplished by a direct mapping from the source node to the destination node. Otherwise, control is relinquished to an expansion port decoder which identifies the particular crossbar modules in the subsequent stages of the interconnection network in which the designated nodes are defined.

Appropriate sub-mappings are then provided for serially linking the expansion ports of the crossbar modules identified as housing the ports for the source and the destination nodes. In physical terms, the sub-mappings establish a sequential, yet direct link for transfer of data to or from a requesting source node and a designated destination node. The details involved in implementing a modular crossbar arrangement of the type discussed above, including the identification of the need to address expansion ports, the decoding process for identifying modules containing a source and destination nodes, and the generation of sub-mappings linking the nodes will be discussed in detailed below.

BRIEF DESCRIPTION OF THE DRAWINGS

Other objects and advantages of the invention will become apparent upon reading the following detailed description and upon reference to the drawings in which:

FIG. 5 is a table illustrating the preferred control inputs for defining the source/destination ports for the two-staged arrangement of crossbar modules shown in FIG. 3;

FIG. 6 is a table illustrating the preferred control inputs for defining sub-sources and sub-destinations for crossbar modules when sub-mappings are needed to execute communication requests;

FIG. 8 is a flowchart illustrating the arbitration of communication requests and the response of the data switch controller to granted requests for controlling the crossbar modules for establishing the requested data transaction paths between system units.

Figure 1:
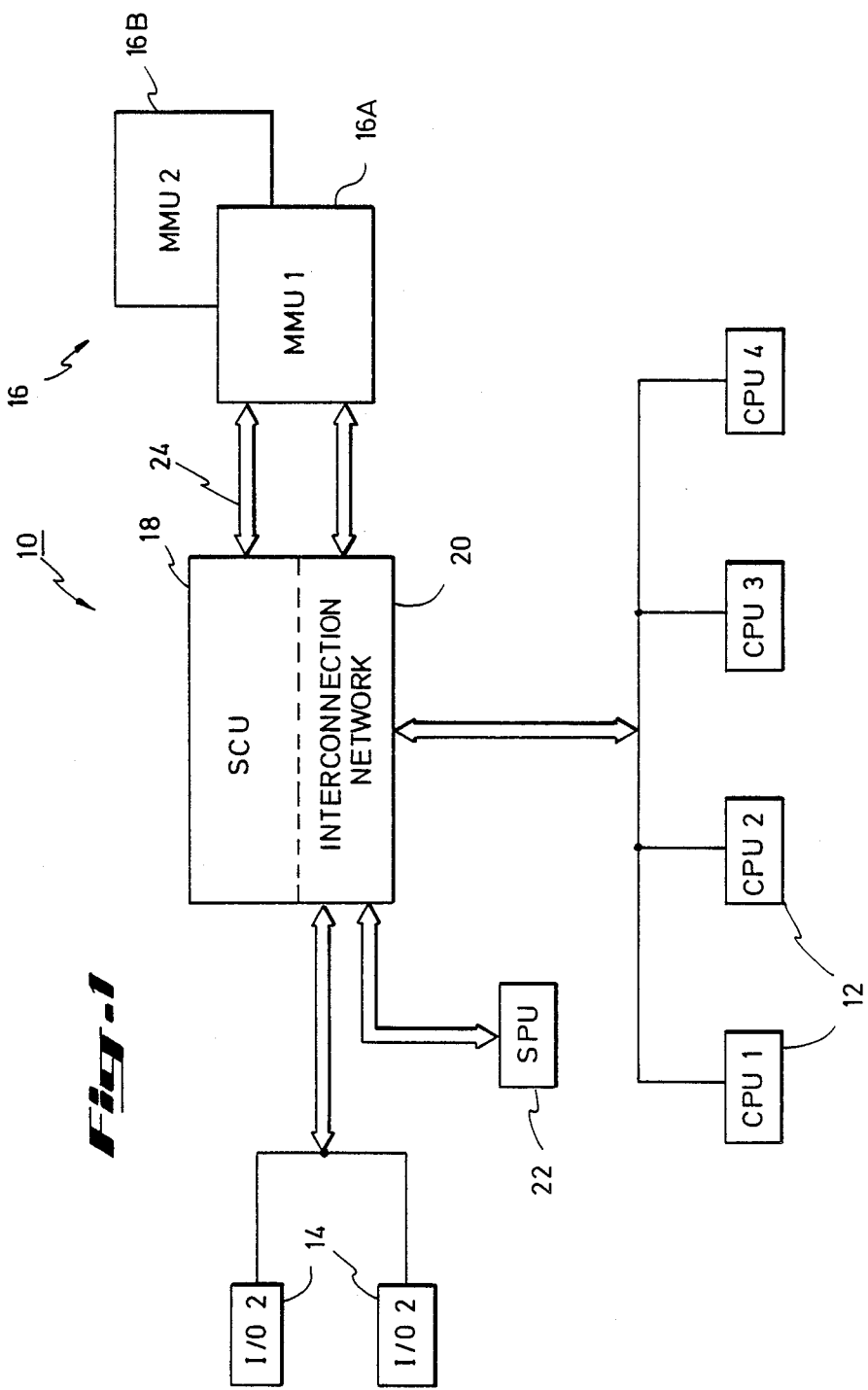
FIG. 1 is a simplified block diagram illustrating a multi-processor computer system in which a system control unit (SCU) is provided with an interconnection network for linking a plurality of processors and input-/output (I/O) units together and to a shared memory.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENT

Turning now to the drawings and referring in particular to FIG. 1, there is shown a simplified block diagram of a multi-processor computer system 10 which uses a plurality of central processing units (CPUs) 12 and is adapted to permit simultaneous operation of the system CPUs, in combination with a plurality of input-/output (I/O) units 14, by allowing the system units to share a common main memory 16 for the system. The I/O units 14 are used to permit the processing system in general and the CPUs in particular to communicate with the external world through an appropriate I/O interface (not shown) associated with the units. The main memory 16 itself typically comprises a plurality of memory modules or units 16A and 16B. A system control unit (SCU) 18 links the CPUs 12 and I/O units 14 to the main memory 16 and to each other through an interconnection network 20. The SCU 18 also uses the interconnection network 20 to link the various system modules to a service processor/console unit (SPU) 22 which performs traditional console functions including status determination and the control of the overall operation of the processing system.

In the multi-processor system of FIG. 1, efficient communication between system units linked through the SCU 18 and the main memory 16, and more particularly between each system CPU 12 and each system I/O unit 14 and the individually addressable segments comprising each memory unit 16A, 16B is handled through dedicated interface means 24. The specific configuration of the main memory and the particular manner in which the SCU is interfaced to the memory is not important to the present invention and accordingly will not be discussed in detail herein. For purposes of describing the present invention, it suffices to state that each memory unit 16A, 16B of the main memory 16 is provided with a corresponding memory port on the SCU with each port being linked to a separate pair of individually addressable segments which are interleaved on block boundaries.

The interconnection network 20 functions as means for providing a path for data transactions between the various system units and the multi-processor system and links the CPUs 12, the I/O units 14, and the SPU 22 together for exchange of data between themselves and each of the plurality of main memory units (MMUs) 16A and 16B. Accordingly, the interconnection network 20 may form part of the dedicated interface means 24 between the SCU and main memory in addition to linking the remaining system units.

Each system unit, such as a CPU or an I/O unit, is ported into the SCU 18 through a discrete port and all communication requests between memory and the system units, as well as between the units themselves, are lodged at the corresponding port on the SCU. The SCU 18 functions to keep system units active while avoiding inter-unit conflict by handling requests for communications between the system unit and the system memory that are received at various ports on the SCU. Because the various CPUs and I/O units are operated in a parallel fashion within the multi-processor system, a plurality of communication requests are routinely received at the SCU. In addition, a number of such requests may typically require access to the same system resources in order to honor the requests by executing the commands associated therewith.

Incoming requests received at the SCU ports from the system units are arbitrated for processing by the SCU in a manner which utilizes the system resources in the most efficient manner and in addition treats each arriving system request in a fair manner by processing the request within a reasonable period of time. A preferred technique on the basis of which the SCU can arbitrate outstanding requests from system units in such a way as to achieve the dual requirements of system efficiency and unit fairness is described in the above mentioned Flynn et al. U.S. application Ser. No., 07/306,871, filed Feb. 3, 1989 titled "Method and Means for Arbitrating Communication Requests Using A System Control Unit In a Multi-Processor System," which is also owned by the assignee of the present invention.

Regardless of the arbitration technique that is used to define the order in which incoming communication requests are processed, it is critical that a number of data transactions between system units be performed simultaneously in order to achieve efficient system operation by optimizing the processing capabilities of the plurality of system CPUs.

Traditional interconnection networks have typically comprised of shared buses in systems where simultaneous multiple data transactions are not critical. Where a number a number of data transactions have to be processed concurrently, interconnection networks have conventionally relied on crossbar switches implementing a generalized connection network to provide a mapping between a fixed number of input or source nodes and output or destination nodes in such a way that a selected source node may be linked to a designated destination node.

Such interconnection networks are effective in linking the system units as long as the number of units does not exceed the maximum number of source/destination nodes for which the crossbar switch used in the interconnection network has been designed. The networks, however, become problematic when the multi-processing system has to be reconfigured to include additional system units.

Consider, for instance, the multi-processor system shown in FIG. 1 which includes four CPUs, two I/O units, two MMUs, and one SPU. In its most basic form, such a system may be configured to include only two CPUs operating in conjunction with a single I/O unit and a single MMU. The overall computer system could be designed in a modular fashion so that the system may be upgraded by additional CPUs, I/Os, and MMUs. A typical upgrade would, for example, be the replication of the basic network formed by the system CPUs, i.e., the addition of two CPUs, one I/O unit, and one MMU, to eventually yield the multi-processing system as shown in FIG. 1. If the interconnection network linking the system units were to be designed on the basis of the basic configuration, i.e., the system based on a pair of CPUs operating in combination with an I/O unit and a MMU, the subsequent upgrading of the system to include additional system units would necessitate the use of a redesigned modular switch capable of accommodating the increased number of system units. It will be readily apparent that such a redesign is extremely time-consuming, costly, and impractical for commercial applications. The only alternative is to initially design the crossbar switch for the interconnection network to include additional capacity or accommodating added system units; such an approach would unnecessarily complicate and render costly the interconnection network for applications where the added capacity is of little use because the multi-processing system is unlikely to require upgrading.

The above problems are solved, according to the system of this invention, by the provision of a interconnection network based upon crossbar switches which are modularly designed so that additional system units may be conveniently incorporated into the overall computing system by the use of additional crossbar switches which are adapted to be conveniently linked to existing crossbar switches. Each modular crossbar switch (referred to herein as a crossbar module) is provided with discrete input and output expansion ports through which a crossbar module may be linked to other identically configured crossbar modules when additional source/destination nodes are to be integrated into the system. Crossbar modules linked in such a way in effect provide an expanded switching network configured for mapping between previously existing and added source/destination nodes without the need to redesign the basic crossbar switch itself.

Figure 2:
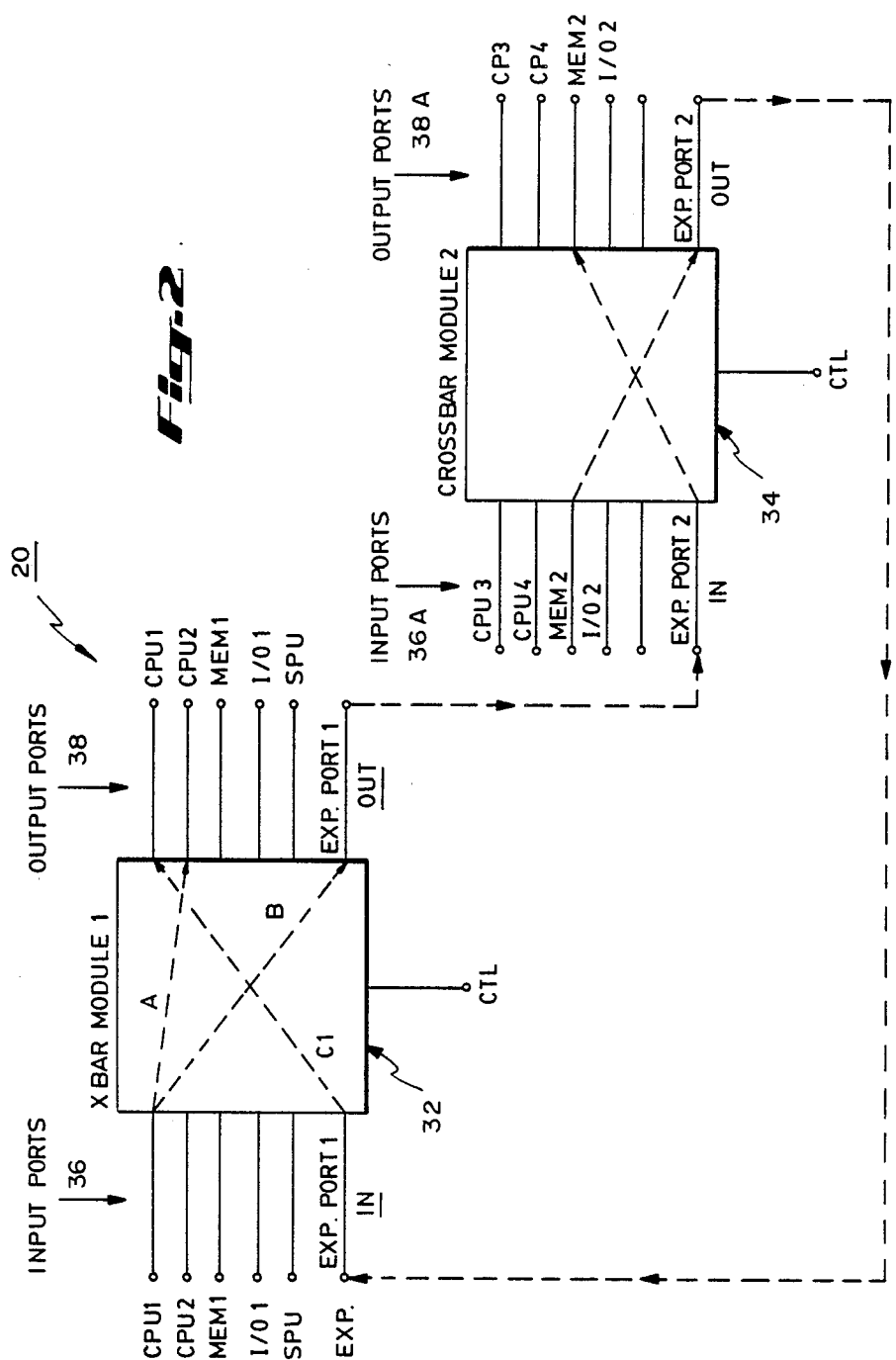
FIG. 2 is a simplified illustration of a preferred interconnection network in the form of a pair of crossbar modules serially linked through expansion ports for use with the multi-processor system of FIG. 1.

Such a modular arrangement is shown in FIG. 2 which is a block diagram illustrating a preferred construction of the interconnection network 20 using a pair of crossbar modules linked through expansion ports provided on each module. The interconnection network 20 is composed of first and second crossbar modules respectively designated as 32 and 34 which are linked together in such a way as to selectively provide a direct link between the source and destination nodes included within each of the crossbar modules. More specifically, crossbar module 1 (designated in FIG. 2 as reference numeral 32) is preferably designed to map a plurality of input ports 36 onto a corresponding plurality of output ports 38. According to a preferred embodiment, the crossbar module 32 is adapted to accept data commands at five discrete input ports designated respectively as the ports for CPU 1 (for data transactions in which CPU 1 constitutes the source node), CPU 2 (for transactions in which CPU 2 acts as source node), MEM 1 (for transactions where MMU 1 acts as the source node), I/O 1 (for transactions where the first I/O unit acts as the source node), and the SPU port (for transactions where the SPU acts as the source node).

On a similar basis, the outputs 38 essentially correspond to the input source nodes, and in particular, include five destination nodes designated as CPU 1, CPU 2, MEM 1, I/O 1, and SPU. The specific connection or link provided between the source and destination nodes by the crossbar module is determined by a control signal provided to the module (see reference letters CTL in FIG. 2). Preferably the control signal CTL is conveyed over a multi-line bus having preassigned lines, corresponding to bit positions in the control signal, for establishing contact between corresponding source and destination nodes.

According to a feature of the present invention, an additional set of nodes is provided for the crossbar module 1 in the form of an input expansion port 1 and a corresponding output expansion port 1. The crossbar module 32 is by itself capable of providing a direct mapping between the five defined source nodes and the corresponding destination nodes and is accordingly capable of accomplishing data transactions within the basic system configuration comprising CPUs 1, 2, I/O unit 1, MMU 1, and the SPU. A direct-mapped data transaction in such a basic system is conveniently handled by providing a control signal that activates the link between a designated source node and the corresponding designated destination node within the same crossbar module. For instance, a data transaction between CPU 1 and CPU 2 may be achieved by activating the link shown as a dashed line and designated by the reference letter A between CPU 1 and CPU 2.

When the multi-processing system is upgraded to include four CPUs, two I/O units, and two MMUs, an additional crossbar module 2 (designated by the reference numeral 34) is serially linked to a crossbar module 1. Module 2 is identical in configuration to module 1 and has provision for a corresponding plurality of input ports 36A and output ports 38A. The input ports 36A in module 2 are designated as corresponding respectively to the additional system units in the upgraded system, i.e., to CPU 3, CPU 4, MEM 2, and I/O unit 2 respectively. Since the same SPU module is generally capable of handling the console functions for the upgraded single configuration also, the remaining input port and the corresponding output port are left unused on module 2.

The serial connection between the two crossbar modules is effected by linking the output expansion port 1 of module 1 to the input expansion port 2 of module 2; in addition, the output expansion port 2 of module 2 is linked to the input expansion port 1 of module 1. The expansion ports serve as secondary links that effectively provide a direct link between source and destination nodes that are spread across the two crossbar modules. More specifically, consider the case where a data transaction is to be executed between CPU 1 and MMU 2; this requires a mapping to be performed between the source node CPU 1 and the destination node MEM 2. Such a direct mapping is accomplished by means of a series of sub-mappings represented by a first sub-mapping from source node CPU 1 to the destination node represented by output expansion port 1 over the link represented by the dashed line designated by the reference letter B, and a second sub-mapping between the source node represented by the input expansion port 2 of module 2 and the designated destination node MEM 2 over the dashed path designated by reference numeral B1.

Consider another example where a data transaction is to be executed between the node MEM 2 on the crossbar module 2 and the node CPU 1 on crossbar module 1. The direct mapping required between the source node MEM 2 and destination node CPU 1 is accomplished by a series of sub-mappings comprising a first sub-mapping from source node MEM 2 to the destination node represented by output expansion port 2 of module 2 over the dashed path designated by the reference letter C, and a second sub-mapping between the source node designated by the input expansion port 1 of module 1 and the ultimate destination node CPU 1 over the dashed path represented by the reference letter C1.

Using the modular design of the crossbar modules shown in FIG. 2, the integration of additional system units into an existing multi-processor system becomes a simple matter of integrating as many additional crossbar modules into the system as are needed for accommodating the added system units. The integration of additional crossbar modules is conveniently accomplished by serially linking the modules through their expansion ports. Direct mapping of source and destination nodes spread across more than one crossbar module is accomplished equally conveniently by defining the required direct mapping in terms of corresponding sub-mappings between the crossbar modules which respectively contain the designated source and destination nodes.

Figure 3:
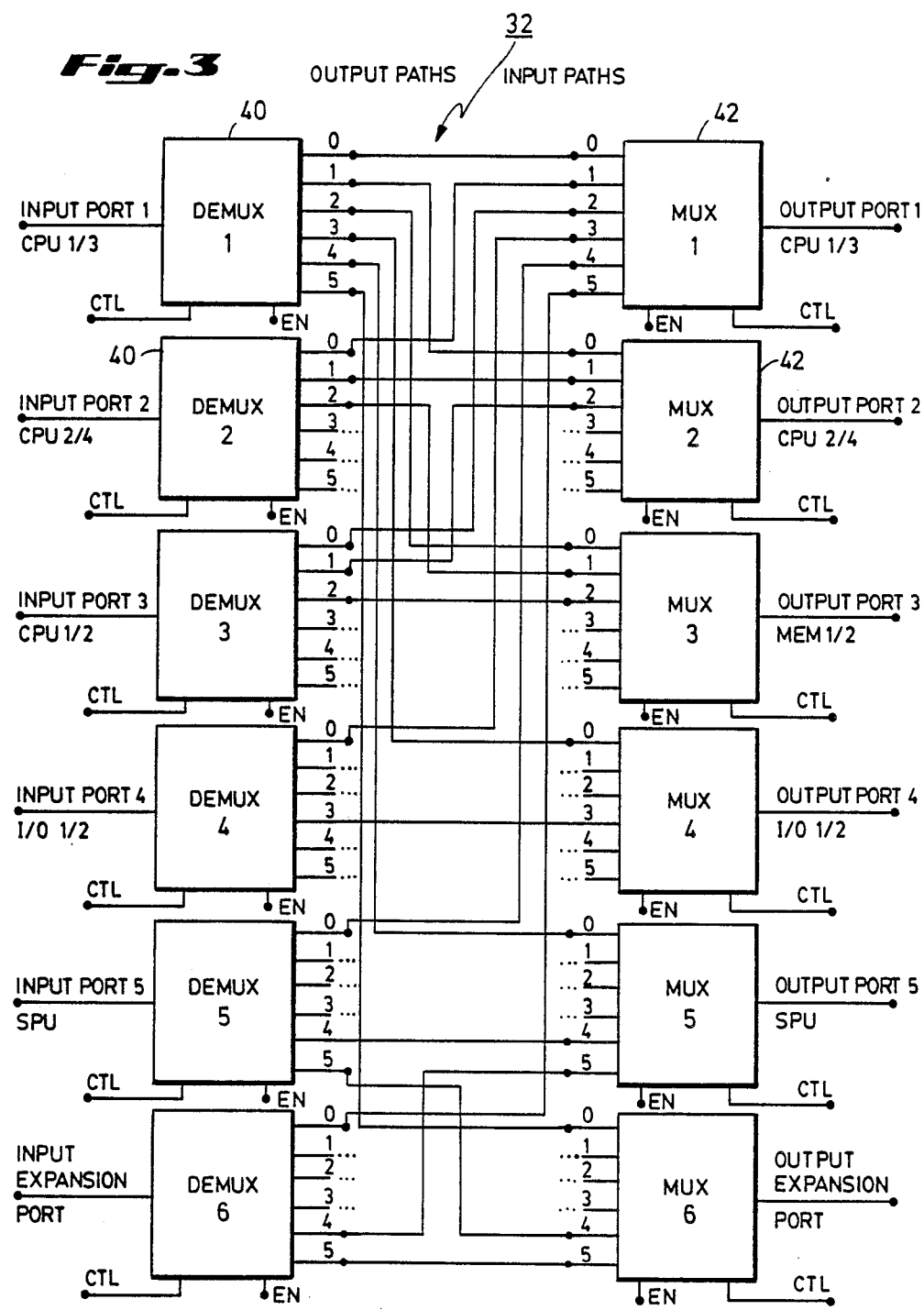
FIG. 3 is a detailed schematic diagram of the basic modular composition of a crossbar module illustrating the manner in which input nodes are mapped onto output nodes including the expansion nodes.

Turning now to FIG. 3, there is shown a detailed schematic diagram of a preferred modular construction of a crossbar module adapted for use in direct mapping and sub-mapping of source nodes to destination nodes through expansion ports. As shown therein, the crossbar module 32 comprises a plurality of demultiplexer (DEMUX) units 40 corresponding to the various system units that are to be ported into the crossbar module. More specifically, the module 32 includes DEMUX 1 for establishing a source node as input port 1 corresponding to data transactions originating from CPU 1. DEMUX 1 is configured to connect input port 1 to selected one of a plurality of output paths on the basis of a control signal (CTL) provided to the module. The number of output paths between which the source node may be switched corresponds to the total number of system units that may be ported into a single crossbar module; an additional output path is provided for linking DEMUX 1 to an expansion port, as will be explained in detail below.

According to a preferred embodiment, the basic crossbar module is designed to provide data transaction paths for up to five separate system units. Accordingly, DEMUX 1 is adapted to switch its source node, i.e., CPU 1 connected to input port 1, between six output paths 0–5, of which paths 0, 1, 2, 3 and 4 correspond to the various destination nodes representing the output ports to which the system units are linked. On a similar basis, DEMUX 2 is provided for defining a source node corresponding to the input port 2 to which CPU 2 is connected, DEMUX 3 is provided for establishing as a source node input port 3 to which MEM 1 is connected, DEMUX 4 is provided for establishing a source node corresponding to input port 4 for I/O 1, and DEMUX 5 is provided for establishing a source node corresponding to input port 5 to which the SPU is connected.

The crossbar 32 is also provided with a corresponding set of multiplexers (MUX) each of which is adapted to switch one of a plurality of input paths onto a single output port in order to establish a path for data transactions in which a system unit connected to the output port is designated as the destination node. More specifically, MUX 1 is provided in correspondence with DEMUX 1 and has a plurality of input paths designated by reference numerals 0–5, of which paths 0, 1, 2, 3, and 4 are linked to corresponding output paths of the DEMUX units for the various system units that are ported into the crossbar module. As in the case of the DEMUX units, a MUX unit is also provided with an additional input path for linking the MUX unit to the expansion port, as will be explained in detail below.

On a similar basis, MUX 2 is provided for establishing CPU 2 as the destination node at output 2, MEM 1 as the destination node at output port 3, I/O unit 1 as the destination node at output port 4, and the SPU as the destination node at output port 5. Each of the output paths defined at each of the DEMUX units is connected to the corresponding input path in each of the MUX units. For instance, output path 0 of DEMUX 1 is linked directly to input path 0 of MUX 1, output path 1 of DEMUX 1 is linked to the input path 0 of MUX 2, output path 2 of DEMUX 1 is linked to input path 2 of MUX 3, output path 4 of DEMUX 1 is linked to input path 0 of MUX 5. (In general, output m of DEMUX n is connected to input (n−1) of MUX (m+1); for the sake of clarity of illustration, not all of these connections are shown in FIG. 3.) The control signal provided to each DEMUX 1 determines which of the output paths gets linked to the input port. Similarly, the control signal provided to a MUX unit determines which of the input paths gets linked to the output port for the MUX.

A mapping between a source node defined at the input port for a selected DEMUX unit and the destination node defined at the output port for another MUX unit is accomplished by providing a control signal to the DEMUX unit having the desired source node in such as way as to select an output path that is connected to a MUX unit which includes the desired destination node. In the case of a data transaction between CPU 1 and CPU 2, a data path needs to be established between DEMUX 1 which has CPU 1 ported into it and MUX 2 which has CPU 2 ported into it. In order to achieve this, a control signal is provided to DEMUX 1 which links input port 1 (for a CPU 1) to output path 1 which in turn is linked to the input path 1 of MUX 2. At the same time, the control signal provided to MUX 2 is selected to be such that input path 1 is linked directly to output port 2 of MUX 2.

According to a feature of the present invention, each crossbar module is provided with an additional DEMUX-MUX pair in order that crossbar modules may be linked together to expand the source/destination node capacity of the system. More specifically, each crossbar module 32 is provided with a DEMUX 6 which is identical to the other DEMUX units used in the module and defines a source node at an input expansion port which may be selectively linked to the plurality of output paths defined at the DEMUX unit. Of the five output paths 0–5 defined at DEMUX 6, paths 0, 1, 2, 3, and 4 are connected respectively to the input expansion paths for the multiplexer units MUX 1, MUX 2, MUX 3, MUX 4 and MUX 5.

On a similar basis, a multiplexer unit MUX 6 is provided to establish a destination node at output expansion port 1 which can be selectively linked to one of a plurality of input paths 0–5. Of these input paths, paths 0, 1, 2, 3, and 4 are linked respectively to corresponding output expansion paths provided in DEMUX 1, DEMUX 2, DEMUX 3, DEMUX 4, and DEMUX 5 respectively. The control signal provided to DEMUX 6 determines the particular output path of DEMUX 6, and accordingly the corresponding output port connected to the path, which is linked to the input expansion port. Similarly the control signal to MUX unit 6 determines the particular input path to which the output expansion port is linked, and accordingly the expansion output path of the particular DEMUX unit containing the selected source node that gets connected to the output expansion port of MUX 6.

The foregoing arrangement accordingly permits direct mapping between source and destination nodes which are defined within a particular crossbar module. In cases where a data transaction is required between a source node that is part of the crossbar module and destination node which is not within the same crossbar module, the output path of the appropriate DEMUX unit is activated so as to link the corresponding source node to the output expansion port of crossbar module 32. Subsequently, the output expansion port is linked to the input expansion port of the particular crossbar module which does include the designated destination node. Once such a MUX unit has been found, a link is established between the output expansion port of the first crossbar module and the input expansion port of the second crossbar module. Finally, at the second crossbar module end, a control signal is fed to DEMUX 6 which connects the input expansion port to the corresponding input expansion path of the MUX unit which contains the ultimate destination, node. For instance, the input expansion port for DEMUX 6 could be linked to the output port of CPU 1 by a control signal which establishes a link between the input expansion port and the output path 1 which is connected to the input expansion path 5 of MUX 1.

When additional crossbar modules are to be integrated into the system, it is only required that the added crossbar module be serially linked into the existing system by connecting the output expansion port of the existing crossbar module to the input expansion port of the added crossbar module and by connecting the output expansion port of the added crossbar module to input expansion port of the existing crossbar module. It is important that the basic design configuration of the crossbar modules remains the same and the only changes required are the added serial connections to the additional crossbar module.

Figure 4:
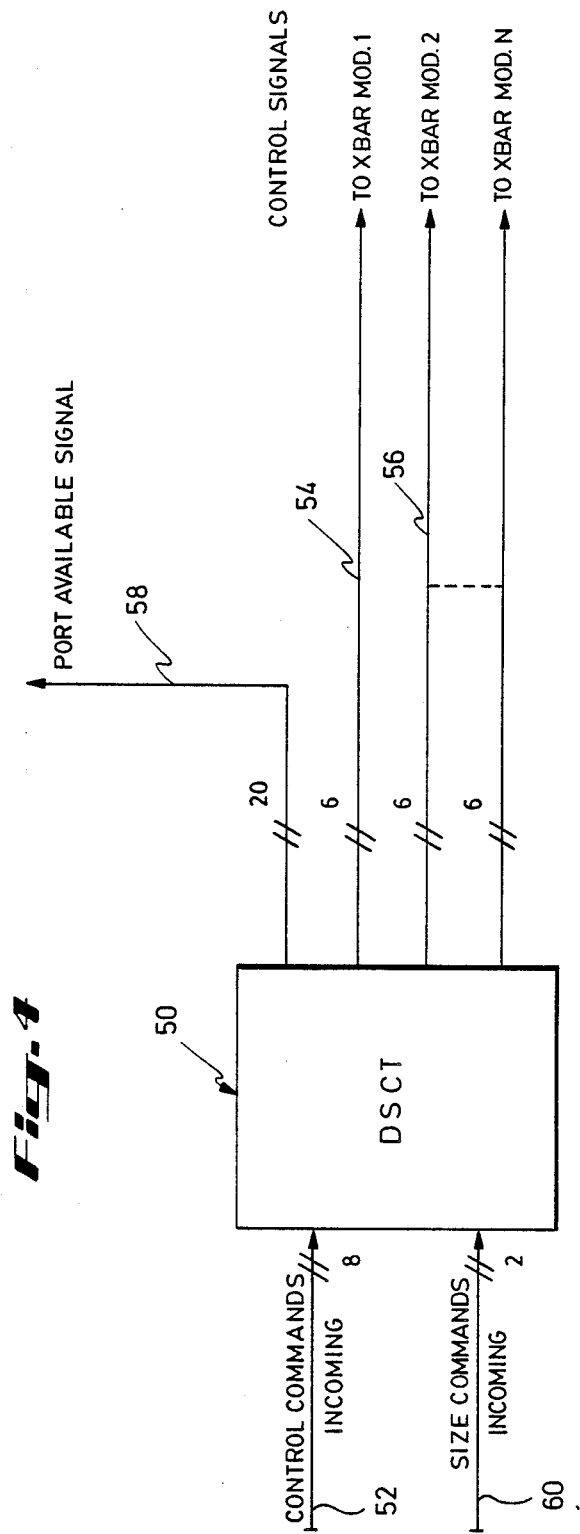
FIG. 4 is a block diagram illustrating data transaction commands recognized by a data switch controller and responsive control signals generated by the data switch controller for controlling the crossbar modules.

Referring now to FIG. 4, there is shown a block diagram illustrating the use of a data switch controller (DSCT) 50 in order to generate the control signals for the crossbar modules to establish the source-to-destination mapping required by incoming data transaction commands. The data switch controller (DSCT) 50 accepts control command signals defining the source and destination nodes related to data transactions to be accomplished through use of the crossbar modules. The control commands 52 are preferably in the form of a predefined bit stream having designated bits for representing the source and destination for the desired data transaction. According to a preferred embodiment, the control field for incoming commands comprises eight bits of data of which the most significant four bits designate the source node while the next significant four bits represent the destination node for the transaction. The preferred number of bits for the various command and control signals is indicated in FIG. 4 by numerals next to double-slash (//) symbols across the respective command and control lines.

FIG. 5 shows a listing of preferred bit-designations for use in defining the source and destination nodes. As shown therein, of the 16 combinations that are possible with the four-bit control field, the first eight are reserved for designation of nodes within the first of the two crossbar modules shown in the preferred interconnection network of FIG. 2, i.e., module 1. Of these eight bits, control bits corresponding to decimal values of 0, 6 and 7 are unused while control bits corresponding to decimal values of 1, 2, 3, 4, and 5 are used respectively to designate ports corresponding to CPU 1, CPU 2, MEM 1, I/O 1, and the SPU. Of the eight control bit-designations (corresponding to decimal values of 8–15) used for designating ports in the second crossbar module, i.e., module 2, control bits corresponding to decimal values of 8, 13, 14, and 15 are unused; control bits corresponding to decimal values of 9, 10, 11, and 12 are used respectively to designate ports representing CPU 3, CPU 4, MEM 2, and I/O 2.

The DSCT 50 of FIG. 4 is adapted to accept an eight-bit control command which defines the source and destination nodes for the data transaction and in response thereto, to generate control signals 54, 56, respectively, that are used to establish a mapping between desired source and destination nodes existing on one or more of the crossbar modules 1, 2, respectively. It will be understood that the operation of the interconnection network using the crossbar modules and the generation of control signals by the DSCT 50 on the basis of incoming control commands is described herein in terms of a pair of crossbar modules only by way of illustration. Any number of crossbar modules designed according to this invention may be employed to accommodate any desired number of system units in a multiprocessor system. For instance, the DSCT 50 may be adapted to accept control commands having larger control fields in order to generate control signals for establishing a mapping between source and destination nodes spread across more than two crossbar modules.

The listing of four-bit control signals provided in FIG. 5 is aimed at distinguishing port designations between nodes that are spread across two crossbar modules; however, the listing may be conveniently expanded to include additional control bits when additional crossbar modules are used. The control bit-designations in FIG. 5 are selected in such a way so as to provide an easy means of identifying whether or not designated nodes are defined on different ones of the crossbar modules 1 and 2. More specifically, by using the control bit-designations shown in FIG. 5, a determination of whether or not the source and destination nodes associated with a particular data transaction exist on the same crossbar module can be made conveniently by merely testing the most significant bit of source and destination nodes. If the two bits are found to be the same, it is a clear indication that the source and destination nodes lie in the same crossbar module and if the two bits are different it is clear that the source and destination nodes are spread across the two crossbar modules, and accordingly that the mapping between the nodes requires the use of the expansion ports on the two modules.

A major advantage of the arrangement described above, wherein identically configured crossbar modules are used to provide the source/destination mapping, is that the operation of the DSCT 50 in processing the incoming control commands for generating the control signals for each of the crossbar modules linked to the DSCT is greatly simplified. More specifically, it is possible for identical control signals to be generated for controlling the mapping operation of the various crossbar modules; the DSCT 50 subsequently merely has to identify the particular crossbar modules which are to receive the control signals which define the source and destination nodes needed for executing a particular data transaction.

According to a preferred embodiment, the control signals to the crossbar modules produced by the DSCT 50 are in the form of a six-bit command of which three bits each are devoted to defining the source and destination nodes, respectively. The specific bit-designations for identifying a source or destination are set forth in FIG. 6 which is a table of three-bit sub-control values for the crossbar modules. As shown therein, binary bit-designations corresponding to decimal values of 0–5 are used to designate the five ports or nodes that are defined at every crossbar module. Of these values, decimal values of 1 and 2 are used respectively to define ports corresponding to the first and second CPUs that are located on a crossbar module. Decimal values of 3, 4, and 5 are used to define ports corresponding to the memory unit, the I/O unit, and the SPU, respectively, ported into that crossbar module. The bit-designation corresponding to decimal value 6 defines the expansion port for the module.

With the above arrangement, the sub-control signals for any given data transaction can be defined in general terms without the need for separate bit-designations for identifying each individual transaction node defined at all crossbar modules within a system. For instance, in the preferred embodiment of FIG. 2 where two crossbar modules are used to support data paths for four CPUs 1–4, the bit-designations for identifying ports corresponding to CPU 1 and CPU 3 are identical; establishment of the desired data path is accomplished by relaying this control signal to the correct crossbar module which contains the desired node. Accordingly, if CPU 1 is to be designated as a source node, the bit-designation of 001 is relayed as sub-control signal to crossbar module 1 whereas the same signal is relayed to crossbar module 2 if CPU 3 is to be designated as the source node.

In FIG. 4, the DSCT 50 also generates a port unavailable signal 58 which provides the instantaneous status of all system ports that are defined as source/destination nodes within the interconnection network. More specifically, the port unavailable signal 58 comprises as many bits as the number of system ports with each bit indicating whether or not the corresponding port is available for use in establishing data paths required by incoming data transaction requests. It should be noted that a given port can only be used to establish a data path for a single data transaction at any given time. Accordingly, once the port has been used to define a data path, it has to be rendered unavailable for subsequent transaction requests until the corresponding data transaction has completed over the path. For this purpose there is provided means for defining the duration of data transfer once a data path has been established by a direct or indirect mapping between the source and destination nodes as described above in detail.

Information regarding the duration required for a data transaction to complete is provided in the form of a "size" command 60 that is received from the SCU along with the control command signal 52. The control commands 52 define the source and destination nodes, for all required transactions, in a manner corresponding to the control field that is recognizable by the DSCT 50. The size command 60 may be provided along with each required data transaction to define the length of time required for actual data transfer once an appropriate data path has been established by using the crossbar modules. Preferably the transfer times are defined in terms of a predetermined number of system cycles for transferring data according to specified transaction requests.

In a preferred embodiment of this invention, transfers from a CPU unit to a memory unit or vice versa, are always defined to require eight system cycles, while data transfers from a CPU to an I/O unit or vice versa, between CPUs and between I/O units are predefined as requiring only a single system cycle. For data transactions which fall under these predefined transfer categories, there is no need for size commands to accompany the original control commands. In most systems, transfers between I/O units to memory units are, however, usually not of a predefined length and consequently the data transfer time is also not fixed and varies from transaction to transaction. It is in the case of such transactions that the size command becomes important. The size command 60 is preferably in the form of a two-bit signal indicating whether a particular data transaction requires one, two, four, or eight system cycles for completion. The DSCT 50 uses the size command only when it is determined that a data transaction has been requested between an I/O unit and a memory unit.

Figure 7:
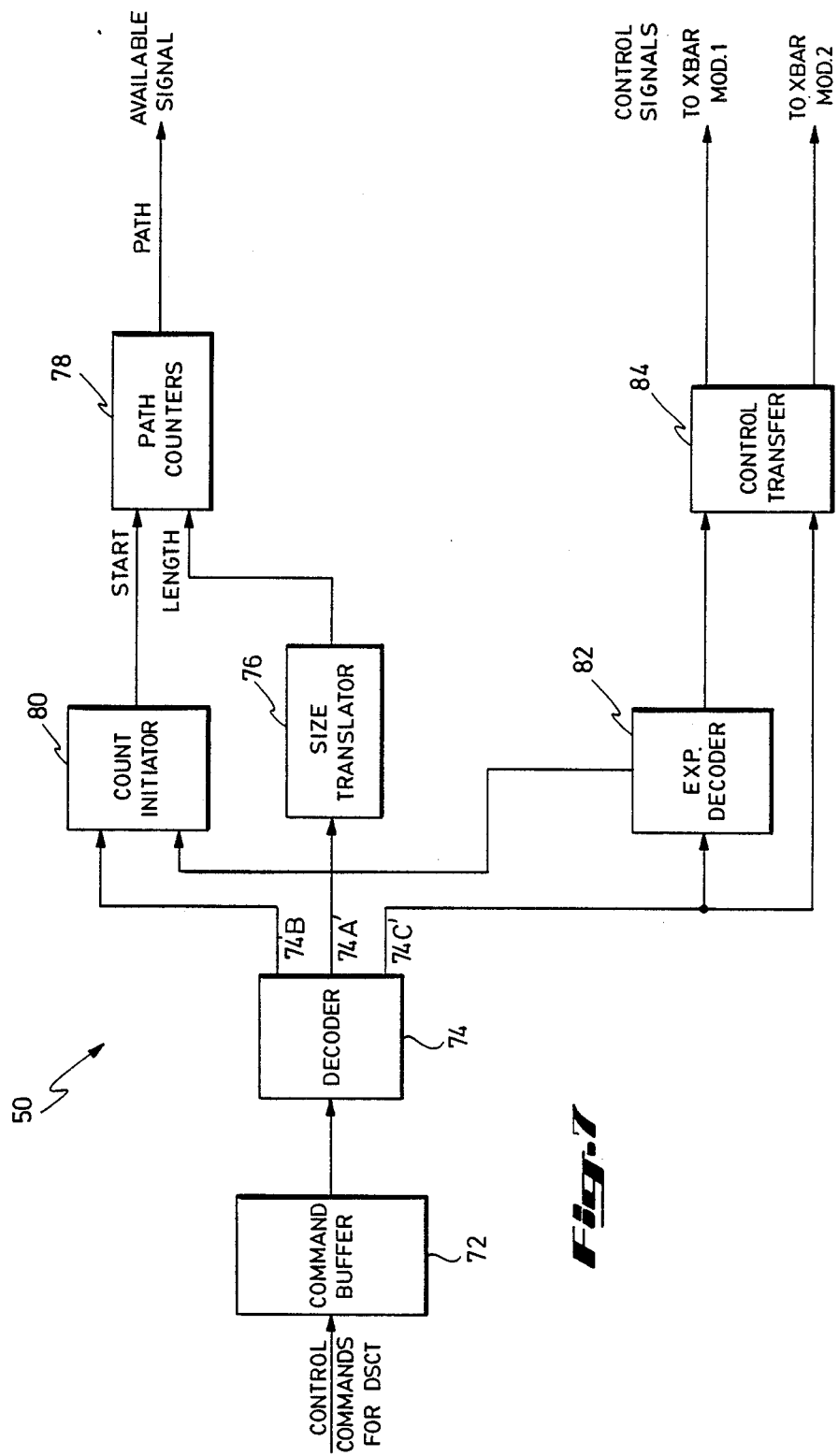
FIG. 7 is a block diagram of a preferred modular construction for the data switch controller of FIG. 4.

Referring now to FIG. 7, there is shown a block diagram of a preferred modular construction for the data switch controller 50 introduced in FIG. 4. As shown in FIG. 7, the DSCT 50 comprises a command buffer 72 for accepting the incoming original control commands along with any accompanying size commands that are received from the SCU. Incoming commands are latched out of the command buffer into a decode unit 74 which splits up the incoming commands into three separate signals 74A, 74B and 74C for further processing. The signal 74A represents the size command or field and is provided to a size translation module 76 which decodes the two-bit size command into one of four predefined length commands defining the duration of time for which the ports used in a particular data transaction are to be designated as unavailable for further data transactions. Path counters 78 are provided for maintaining an updated status of the availability or nonavailability of various system ports. A single counter (not shown separately) is provided for each of the source/destination nodes that are defined within the interconnection network.

In the preferred embodiment of the invention, twenty counters are provided corresponding to the source and destination nodes respectively defined for the two CPUs, the single MMU, the single I/O unit, the single SPU, and the expansion port provided on each of the two crossbar modules. (The expansion ports represent intermediate nodes within the interconnection network, so that in FIG. 2, "expansion port 1 out" and "expansion port 2 in" represent the same node and have one corresponding counter, and "expansion port 1 in" and "expansion port 2 out" represent another node having another corresponding counter.) Each of the counters 78 is adapted to generate a single bit signal that is asserted in response to a "start" signal for a duration of time specified in terms of system cycles by the "length" signal from the size translation module 76. The "start" signal is generated by a count initiator 80 which accepts decoded signals 74B comprising the source and destination bit-designations and in response thereto generates initiation signals aimed at the particular path counters 78 corresponding to the source and destination nodes represented by the decoded signals. More specifically, the count initiator 80 comprises a plurality of 4-to-16 decoders each of which is adapted to accept the four-bit command identifying a source or destination node and decode it into one of the nine port designations (see the listing of FIG. 5) which identifies the node involved in the transaction. A single-bit signal is then sent out to the corresponding path counter so that the corresponding bit in the port unavailable signal may be asserted for durations specified by the length signal.

The decode unit 74 also puts out a signal 74C which represents the bit-designations corresponding to the designated source and destination nodes. This signal is fed to an expansion decoder module 76 which determines whether or not the source and destination nodes specified by an incoming control command are spread across more than one of the crossbar modules, so that the use of an expansion port is required to provide the mapping between the source and the destination nodes.

In the preferred embodiment, the determination is conveniently made by a comparison of the most significant bits in the bit-designations for the source and destination nodes, as has been described above (see the control fields listed in the table of FIG. 5) . If both the MSBs are both found to be equal to zero—a condition which occurs when both the source and destination nodes are included within crossbar module 1—the expansion decoder 76 provides an indication that the sub-control signals to be generated subsequently are to be relayed only to crossbar module 1 only. If the bit-designations for the source and destination nodes are found to have MSBs which are both equal to 1—an indication that both the source and destinations nodes exist within crossbar module 2—the decoder 76 generates an indication that the subsequently generated sub-control signals are to be relayed only to crossbar module 2. For cases where the MSBs are found to be unequal—an indication that the source and destination nodes are spread across both the crossbar modules 1 and 2— the expansion decoder 82 generates a signal which is relayed to the count initiator 80 and serves as a basis for activating the path counter 78 corresponding to the expansion port to provide an indication that the expansion port is unavailable for data transactions.

The decoder 74 is also adapted to generate a signal indicating that sub-controls have to be relayed to both the crossbar modules when the source and destination nodes are spread across crossbar modules. The generation of sub-control signals on the basis of incoming control commands is performed by the control transfer unit 84 which accepts the signals generated by the decoder unit 82. The control transfer unit 84 also accepts the signal 74C generated by the decoder unit 74 comprising the eight bits of incoming control commands which designate the source and destination nodes. The operation of the control transfer unit 84 is easily understood in view of the fact that the source and destination node designations for crossbar module 1 and crossbar module 2 differ only with respect to their MSB (see FIGS. 5 and 6). Accordingly, the generation of sub-controls involves the stripping of the MSB from the incoming control commands. More specifically, when no expansion port is needed, the control transfer unit 84 relays the three LSBs of the bit-designations for the source and destination nodes received from the decoder 82 to the appropriate crossbar module.

When the expansion port is required for providing a mapping, the sub-controls are generated by relaying designations for "sub-sources" and "sub-designations" to each of the two crossbar modules. More particularly, for the crossbar module that contains the designated source node, the three LSBs of the original source designation are used to define the sub-source and the sub-destination is defined to be the output expansion port of the crossbar module. Similarly, for the crossbar module which contains the designated destination node, the three LSBs of the original bit-designation are retained to define the sub-destination node for that module while the sub-source is defined to be the input expansion port of that module.

The overall operation of the system described above, and, in particular, the operation of the DSCT discussed in relation to FIGS. 6 and 7, will now be discussed with reference to a specific data transaction in which the source node is designated to be MEM 2 and the destination node is designated to be I/O 1. By referring to FIG. 5 it is clear that the original control command corresponding to such a data transaction would include a bit-designation of 1011 for the source and a bit-designation of 0100 for the destination. At the expansion decoder 82, the MSBs of the source and destination are compared and because they are different provide an indication that an expansion port is required. At the same time, the count initiator 80 processes the source and destination bit-designations and causes the path counters corresponding to the ports MEM 2 and I/O 1 to be designated as unavailable.

The decoding of the size field received with the incoming commands need only be performed for those data transactions which do not fall under the categories of transactions for which the data transaction period is predefined. As described above, for all transactions between CPUs and memory units the data transaction period is predefined, preferably as eight system cycles, while the period for data transactions between CPUs and I/O units is also predefined, preferably as a single system cycle. Accordingly, the size field need only be decoded for transactions occurring between I/O units and the memory units. The size translator 76 in FIG. 7 uses a predefined size translation algorithm to generate the length command to be relayed to the appropriate path counter; this signal is based upon selecting one of the predefined data transaction periods or upon decoding the size field accompanying the incoming command. The size translation algorithm involves a determination of whether or not a particular transaction command requires a mapping between a CPU unit and either a memory unit or an I/O unit. If the determination is found to be in the affirmative, the appropriate predefined transaction period can be used to define the length command. It is only if the determination is in the negative that the size field needs to be decoded.

More specifically, according to the preferred embodiment, the size translation algorithm constitutes the following three steps:

(1) In the first step a test is performed to see if bits number 3 of the bit-designations for the source and destination nodes are both equal to 0. If the test is affirmative, it is an indication that the data transaction involves a mapping between main memory units and according the predefined 8-cycle data transaction period can be employed.

(2) If the test at step (1) is found to be negative, a test is performed to see if bits number 3 are both equal to 1. An affirmative determination is indicative of the fact that the transaction requires a mapping between a CPU unit and a I/O unit and accordingly the predefined data transaction period of one system cycle can be employed.

(3) If the answers at either step 1 or step 2 are found to be negative, i.e., bits number 3 for the bit-designation corresponding to the source and destination nodes are unequal, the bit-designations are further tested to see if of either them represents a memory node. More specifically, the bit-designations are checked to see if they represent a decimal values of 3 or 11, which are values representing the port designations for MEM 1 and MEM 2, respectively (see FIG. 5). If the answer to any of these tests is found to be affirmative, it is an indication that the data transaction requires a mapping between an I/O unit and a memory unit and accordingly the size field accompanying the incoming command is decoded to generate the "length" command as described above. If the test results in a negative answer, it is an indication that the transaction requires a mapping between I/O units and the predefined single-cycle data transaction period is employed.

Consider the application of the above size translation algorithm to the example discussed above. For a data transaction from CPU 1 to MEM 2, the original command would specify bit-designations respectively of 0001 and 1011 (see FIG. 5) respectively for CPU 1 and MEM 2. Step 1 of the size translation algorithm yields an affirmative answer since bits number 3 for both the source and destination nodes are in fact equal to zero. Accordingly the predefined data transaction period of eight system cycles can be employed and there is no need to decode the size field in order to generate the length command.

Referring now to FIG. 8, there is shown a flowchart illustrating the overall procedure involved in operating the crossbar module to provide interconnections between system units. This procedure includes a first phase in which arbitration occurs between any conflicting communication requests, and a second phase in which a control command for a request having priority is decoded to provide control signals to the crossbar modules for setting the connections specified by the command. The arbitration phase is performed by arbitration logic (not shown), the preferred form of which is described in the above-referenced Flynn et al. U.S. patent application Ser. No. 07/306,871, filed Feb. 3, 1989, titled "Method and Means for Arbitrating Communication Requests Using a System Control Unit in a Multi-Processor System." The command decoding phase is performed by the DSCT 50 as previously shown in FIGS. 4 and 7.

In FIG. 8, the original incoming commands are accepted at step 100. Associated with each system unit, for example, is a respective command buffer (not shown) for accepting incoming data transaction commands from the respective unit. The arbitration logic (not shown) receives as its input the contents of the respective command buffers and respective flags indicating whether the command buffers presently store a valid and unexecuted command, and also the contents of a "wait list" or queue (not shown) containing commands that have not been executed due to the unavailability of source, destination, or expansion nodes, or due to competing commands having been granted priority. At step 101, the source and destination nodes specified by the commands are tested to see if they are available for establishing a data path for the requested transactions. Such a test is conveniently performed by testing the path unavailable signals put out by the path counters 78 (see FIG. 7) to see if the bits corresponding to the source and destination nodes which correspond to the incoming commands are asserted. If it is found that either or both of the nodes are not available for a command, step 102 is accessed for that command to store that command in a "wait list" or queue until such time as the nodes become available.

For commands for which their respective source and destination nodes are found to be available at step 101, in step 103 the control fields representing the bit-designations for the source and destination nodes are tested and a determination is made as to whether or not the source and destination nodes are defined within the same crossbar module. For the commands having respective source and destination nodes on different cross bar modules, it is determined in step 104 whether the expansion nodes required for the connections are available. If not, the required resources are not available for executing these commands and therefore in step 102 these commands are placed in the wait list or queue. Otherwise, in step 105, there are one or more commands which could be executed with presently available resources. If there are more than one such command, it is possible that they may require the same source, destination, or expansion nodes. Therefore, step 105 requires arbitration among commands competing for source, destination and expansion nodes. Preferably the arbitration is conducted in such a manner so as to efficiently utilize the system resources, as further described in the above referenced Flynn et al,. U.S. application Ser. No. 07/306,871 filed Feb. 'b 1989, entitled "Method and Means For Arbitrating Communication Requests Using A System Control Unit In A Multi-Processor System." If a command is not granted by the arbitration, as determined in step 106, then in step 102 the command is stored in the "wait list" or queue for further arbitration at a subsequent time.

In step 107, the arbitration phase of the procedure has been completed, and the decoding phase begins. The control fields of the command granted priority are tested to determine whether the specified source and destination nodes are on the same crossbar module. If so, then in step 108 control signals are sent to the crossbar module containing both the source and destination nodes in order to establish a direct mapping therebetween. As has been described above, the controls are preferably generated by stripping the most significant bit from the incoming original commands and providing the remaining three bits as control signals to the corresponding crossbar module.

If the answer at step 107 is found to be negative, i.e., the source and destination nodes are not found to be in the same crossbar module it is an indication that the expansion ports on the crossbar modules are needed to establish the required mapping. Therefore, in step 109, the crossbar modules which contain the source and destination nodes specified by the incoming commands are identified. In the preferred embodiment, this is accomplished (preferably by the expansion decoder module 82 of FIG. 7) by testing the MSB of the bit-designations for the source and destination nodes; if the MSB is found to be equal to 0, it is evident that the node is located within crossbar module 1 and if the MSB is found to be equal to 1 it is clear that the node is contained within crossbar module 2.

At step 110, the control signals for establishing the sub-mapping through the expansion ports are provided to the crossbar modules containing the source and destination nodes. As described above, the direct mapping is accomplished by two sub-mappings:

(1) A mapping between the source node defined by the incoming command and the expansion port defined on the crossbar module containing the source node.

(2) A sub-mapping between the crossbar module containing the destination node defined by the incoming command and the defined destination node.

Considering the example discussed above, for instance, the direct mapping between CPU 1 and MEM 2 is accomplished by a sub-mapping from the port for CPU 1 on crossbar module 1 to the output expansion port on crossbar module 1, and a second sub-mapping from the port for MEM 2 on crossbar module 2, and the input expansion port on MEM 2. The serial link established between the expansion ports on modules 1 and 2 provides the connection path from module 1 to module 2.

The completion of either of steps 108 and 110 leads to step 111 which involves the identification of the data transaction period by making use of the size translation algorithm described above. Finally, at step 112, the source, the destination, and the expansion ports that are required to establish a mapping between the originally designated source and destination nodes are rendered unavailable for the identified data transaction period by generating the appropriate path unavailable signal. The procedure is then repeated for additional commands.

We claim:

1. In a multi-processing system of the kind having a system control unit (SCU) for operating a plurality of system units in a parallel fashion, said system units including a plurality of central processing units (CPUs), at least one input/output (I/O) unit and at least one main memory unit (MMU), interconnection means for establishing communication paths for data transactions between system units designated by communication commands as source and destination nodes, said interconnection means comprising:

at least two crossbar modules, each module adapted to establish a direct path or mapping between one of a fixed number of source nodes and one of the same fixed number of destination nodes defined thereupon, the source and destination nodes provided on one crossbar module corresponding to different ones of said system units than those provided on other crossbar modules, each of said modules including at least one expansion source node and at least one corresponding expansion destination node through which the crossbar modules are connectable in such a way as to establish a data path between source nodes defined on one of said crossbar modules and destination nodes defined on another of said crossbar modules, wherein said interconnection means further comprises:

means for accepting control commands designating the source and destination nodes for executing a data transaction, means for determining whether the designated source and destination nodes are defined on a single crossbar module or are defined on separate crossbar modules, means for generating a control signal to said single crossbar module containing both the source and destination nodes in order to establish the required data path by a direct mapping between said nodes, and means for generating separate control signals to each of said crossbar modules on which the source and destination nodes are separately defined in order to establish the required data path by an indirect mapping between said nodes, said indirect mapping being established by (i) a first sub-mapping between the designated source node and the expansion node of the crossbar module containing said source node and (ii) a second sub-mapping between the designated destination node and the expansion node of the crossbar module containing said destination node.

2. The multi-processing system of claim 1 wherein said interconnection means further includes means for generating, for a selected time period, a busy signal indicating that the source node, the destination node, and the expansion nodes being used at a given time for establishing a data transaction path are unavailable for establishing other transaction paths.

3. The multi-processing system of claim 2 wherein the control commands accepted by the interconnection means include a size command defining a period of time for which the required transaction path needs to be established, and wherein said means provided within said interconnection means for generating said busy signal generates said signal for predefined periods of time for certain predefined data transactions, and for other data transactions generates the busy signal on the basis of said size commands.

4. The multi-processing system of claim 1 wherein the system comprises four CPUs, two MMUs, two I/O units, and one service processor unit (SPU), and wherein the interconnection means comprises two crossbar modules, each crossbar module being adapted to provide interconnections between up to five source and destination nodes, respectively corresponding to two CPUs, one I/O unit, one MMU, and one SPU.

5. A multi-processing computer system comprising:
a plurality of system units, said system units including a plurality of central processing units (CPUs), at least one input/.output (I/O) unit, and at least one main memory unit (MMU); and
interconnection means for establishing communication paths for data transactions between system units designated by communication commands as source and destination nodes, said interconnection means including:
at least two crossbar modules; each module including means for establishing a direct path between one of a fixed number of source nodes and one of the same fixed number of destination nodes defined thereupon, and at least one expansion source node and at least one corresponding expansion destination node, the expansion source and expansion destination nodes of one crossbar module being connected to the expansion destination and expansion source nodes, respectively, of the other module for enabling a data path to be established between source nodes defined on one crossbar module and destination nodes defined on the other crossbar module;
means for accepting control commands designating the source and destination nodes for executing a data transaction,
means for determining whether the designated source and destination nodes are defined on a single crossbar module or are defined on separate crossbar modules,
means for generating a control signal to said single crossbar module containing both the source and destination nodes in order to establish the required data path by a direct mapping between said nodes; and
means for generating separate control signals to each of said crossbar modules on which the source and destination nodes are separately defined in order to establish the required data path by an indirect mapping between said nodes, said indirect mapping being established by (i) a first sub-mapping between the designated source node and the expansion node of the crossbar module containing said source node and (ii) a second sub-mapping between the designated destination node and the expansion node of the crossbar module containing said destination node.

6. The multi-processing system of claim 5 wherein the control commands accepted by the interconnection means include a size command defining a period of time for which the required transaction path needs to be established, and wherein said means provided within said interconnection means for generating said busy signal generates said signal for predefined periods of time for certain predefined data transactions, and for other data transactions generates the busy signal on the basis of said size commands.

7. The multi-processing system of claim 6 wherein the control commands accepted by the interconnection means include a size command defining the period of time for which the required transaction path needs to be established, and wherein said means provided within said interconnection means for generating said busy signal generates said signal for predefined periods of time for certain predefined data transactions, and for other data transactions generates the busy signal on the basis of said size commands.

8. The multi-processing system of claim 5 wherein the system comprises four CPUs, two MMUs, two I/O units, and one service processor unit (SPU), and wherein each crossbar module has five source and destination nodes, respectively, connected to two CPUs, one I/O unit, one MMU, and one SPU.

9. In a multi-processing system of the kind having a system control unit (SCU) for operating a plurality of system units in a parallel fashion, said system units including a plurality of central processing units (CUPs), at least one input/output (I/O) unit, and at least one main memory unit (MMU), interconnection means for establishing communication paths for data transactions between system units designated by communication commands as source and destination nodes, said interconnection means comprising:
at least two crossbar modules, each module adapted to establish a direct path between one of a fixed number of source nodes and one of a fixed number of destination nodes defined thereupon, each crossbar module having a respective demultiplexer for each source node and a respective multiplexer for each destination node, each demultiplexer in each crossbar module having an input connected to its respective source node and a respective output for each of the destination nodes in said each crossbar module, each multiplexer in each crossbar module having an output connected to its respective destination node and a respective input connected to a respective output of each of the demultiplexers in said each crossbar module, each of said modules including at least one expansion source node and at least one corresponding expansion destination node, the expansion source node of each module being connected directly to the expansion destination node of another one of the modules, to thereby establish a data path between source nodes defined on one of said crossbar modules and destination nodes defined on another of said crossbar modules; and
control means for operating said demultiplexers and said multiplexers in said modules for executing data transactions between designated source and destination nodes, said control means including means responsive when the designated source and destination nodes are defined on a single crossbar module for operating the demultiplexer of the designated source node and the multiplexer of the designated destination node in order to establish the required data path by a direct path between the designated source and destination nodes, and means responsive when the designated source and destination nodes are defined on separate crossbar modules for operating the demultiplexer of the designated source node and the multiplexer of the destination expansion node on a first one of the separate crossbar modules, and for operating the multiplexer of the destination node and the demultiplexer of the expansion source node on a second one of the separate crossbar modules, in order to establish the required data path by an indirect path between said nodes, said indirect path including the expansion destination node on the module having the designated source node, and the expansion source node on the module having the designated destination node.

10. The multi-processing system of claim 9, wherein said interconnection means further includes means for generating, for a selected time period, a busy signal indicating that the source node, the destination node, and the expansion nodes being used at a given time for establishing a data transaction path are unavailable for establishing other transaction paths.

11. The multi-processing system of claim 10, wherein the control commands accepted by the interconnection means include a size command defining a period of time for which the required transaction paths needs to be established, and wherein said means for generating said busy signal generates said signal for predefined periods of time for certain predefined data transactions, and for other data transactions generates the busy signal on the basis of said size commands.;

12. The multi-processing system of claim 10, wherein the system comprises four CPUs, two MMUs, two I/O units, the one service processor unit (SPU), and wherein the interconnection means comprises two crossbar modules, each crossbar module being adapted to provide interconnections between up to five source and destination nodes, respectively corresponding to two CPUs, one I/O unit, one MMU, and one SPU.

* * * * *